(12) United States Patent
Tong

(10) Patent No.: US 7,734,627 B1
(45) Date of Patent: Jun. 8, 2010

(54) DOCUMENT SIMILARITY DETECTION

(75) Inventor: Simon Tong, Mountain View, CA (US)

(73) Assignee: Google Inc., Mountain View, CA (US)

( * ) Notice: Subject to any disclaimer, the term of this patent is extended or adjusted under 35 U.S.C. 154(b) by 764 days.

(21) Appl. No.: 10/462,690

(22) Filed: Jun. 17, 2003

(51) Int. Cl.
*G06F 17/30* (2006.01)

(52) U.S. Cl. ..................................... 707/737
(58) Field of Classification Search ........................ None
See application file for complete search history.

(56) References Cited

U.S. PATENT DOCUMENTS

| | | | | |
|---|---|---|---|---|
| 4,358,824 A | * | 11/1982 | Glickman et al. | 707/5 |
| 4,691,341 A | * | 9/1987 | Knoble et al. | 379/93.26 |
| 4,823,306 A | * | 4/1989 | Barbic et al. | 707/5 |
| 4,839,853 A | * | 6/1989 | Deerwester et al. | 707/5 |
| 5,297,039 A | * | 3/1994 | Kanaegami et al. | 707/5 |
| 5,321,833 A | * | 6/1994 | Chang et al. | 707/5 |
| 5,418,951 A | * | 5/1995 | Damashek | 707/5 |
| 5,442,546 A | * | 8/1995 | Kaji et al. | 704/4 |
| 5,442,778 A | * | 8/1995 | Pedersen et al. | 707/5 |
| 5,619,709 A | * | 4/1997 | Caid et al. | 715/532 |
| 5,640,553 A | * | 6/1997 | Schultz | 707/5 |
| 5,652,898 A | * | 7/1997 | Kaji | 704/10 |
| 5,675,819 A | * | 10/1997 | Schuetze | 704/10 |
| 5,805,771 A | * | 9/1998 | Muthusamy et al. | 704/232 |
| 5,867,811 A | * | 2/1999 | O'Donoghue | 704/1 |
| 5,909,677 A | * | 6/1999 | Broder et al. | 707/3 |
| 5,913,185 A | * | 6/1999 | Martino et al. | 704/8 |
| 5,913,208 A | * | 6/1999 | Brown et al. | 707/3 |
| 5,926,812 A | * | 7/1999 | Hilsenrath et al. | 707/5 |
| 5,963,940 A | * | 10/1999 | Liddy et al. | 707/5 |
| 6,098,033 A | * | 8/2000 | Richardson et al. | 704/1 |
| 6,112,021 A | * | 8/2000 | Brand | 703/2 |
| 6,119,124 A | | 9/2000 | Broder et al. | 707/103 |
| 6,161,130 A | * | 12/2000 | Horvitz et al. | 709/206 |
| 6,169,999 B1 | * | 1/2001 | Kanno | 715/255 |
| 6,192,360 B1 | * | 2/2001 | Dumais et al. | 707/6 |
| 6,621,930 B1 | * | 9/2003 | Smadja | 382/224 |
| 6,687,696 B2 | * | 2/2004 | Hofmann et al. | 707/6 |
| 6,990,628 B1 | * | 1/2006 | Palmer et al. | 715/500 |
| 7,188,106 B2 | * | 3/2007 | Dwork et al. | 707/5 |

OTHER PUBLICATIONS

"A Bayesian Approach to Filtering Junk E-Mail" by M. Sahami et al. Published 1998. Accessed Jun. 18, 2006. Available from: http://research.microsoft.com/users/horvitz/junkfilter.htm.*

(Continued)

*Primary Examiner*—Neveen Abel Jalil
*Assistant Examiner*—Mark Andrew X Radtke
(74) *Attorney, Agent, or Firm*—Harrity & Harrity, LLP

(57) ABSTRACT

A similarity detector detects similar or near duplicate occurrences of a document. The similarity detector determines similarity of documents by characterizing the documents as clusters each made up of a set of term entries, such as pairs of terms. A pair of terms, for example, indicates that the first term of the pair occurs before the second term of the pair in the underlying document. Another document that has a threshold level of term entries in common with a cluster is considered similar to the document characterized by the cluster.

20 Claims, 9 Drawing Sheets

OTHER PUBLICATIONS

"Inverted index—Wikipedia" by Wikipedia. Accessed Jun. 18, 2006. Available from: http://en.wikipedia.org/wiki/Inverted_index.*

"Inverted index" by P.E. Black in "Dictionary of Algorithms and Data Structures" by U.S. National Institute of Standards and Technology. Dec. 17, 2004. Accessed Jun. 18, 2006. Available from: http://www.nist.gov/dads/HTML/invertedIndex.html.*

"Levenshtein Distance, in Three Flavors" by Michael Gilleland. Available online at http://www.merriampark.com/Id.htm. Accessed Jan. 8, 2006.*

Paul Graham. "A Plan for Spam" Published Aug. 2002. Accessed Sep. 28, 2007. Available online at http://www.paulgraham.com/spam.html.*

Paul Graham. "Better Bayesian Filtering" Published Jan. 2003. Accessed Sep. 28, 2007. Available online at http://www.paulgraham.com/better.html.*

H. Drucker, W.Donghui, V.N. Vapnik, "Support vector machines for spam categorization," Neural Networks, IEEE Transactions on, vol. 10, No. 5, pp. 1048-1054, Sep. 1999.*

Baker, L. D. and McCallum, A. K. 1998. Distributional clustering of words for text classification. In Proceedings of the 21st Annual international ACM SIGIR Conference on Research and Development in information Retrieval (Melbourne, Australia, Aug. 24-28, 1998). SIGIR '98. ACM Press, NY, NY, 96-103. DOI= http://doi.acm.org/10.1145/290941.290970.*

Cohen, W. W. 1996a. Learning rules that classify e-mail. In Papers from the AAAI Spring Symposium on Machine Learning in Information Access, 18-25. http://citeseer.ist.psu.edu/cohen96learning.html.*

Rennie, Jason. "ifile: An Application of Machine Learning to E-Mail Filtering." CMU, Dec. 1998. http://citeseer.ist.psu.edu/article/rennie98ifile.html.*

Deerwester, S., Dumais, S. T., Furnas, G. W., Landauer, T. K., & Harshman, R. (1990). Indexing by latent semantic analysis. Journal of the American Society for Information Science, 41(6), 391-407, http://citeseer.ist.psu.edu/deerwester90indexing.html.*

Cliff. "Ask Slashdot: Seeking Prior Art on Markov-Based SPAM Filters?" Published Nov. 28, 2002. Accessed Sep. 28, 2007. Available online at: http://ask.slashdot.org/article.pl?sid=02/11/27/0841216.*

Cutting, D. and Pedersen, J. 1990. Optimization for dynamic inverted index maintenance. In Proceedings of the 13th Annual international ACM SIGIR Conference on Research and Development in information Retrieval (Brussels, Belgium, Sep. 5-7, 1990). J. Vidick, Ed. SIGIR '90. ACM, New York, NY, 405-411.*

Zhai, C. 1997. Fast statistical parsing of noun phrases for document indexing. In Proceedings of the Fifth Conference on Applied Natural Language Processing (Washington, DC, Mar. 31-Apr. 3, 1997). Applied Natural Language Conferences. Association for Computational Linguistics, Morristown, NJ, 312-319. DOI= http://dx.doi.org/10.3115/974557.9746.*

H. Drucker, W. Donghui, V.N. Vapnik, "Support vector machines for spam categorization," Neural Networks, IEEE Transactions on, vol. 10, No. 5, pp. 1048-1054, Sep. 1999.*

A. Chowdhury et al.: "Collection Statistics for Fast Duplicate Document Detection," pp. 1-30, Apr. 2002.

Co-pending U.S. Appl. No. 10/425,819, filed Apr. 30, 2003 entitled "Systems and Methods for Predicting Lists," 36 page specification, 16 sheets of drawings.

Co-pending Application entitled "Detecting Duplicate and Near-Duplicate Files," filed Jan. 24, 2001; William Pugh et al.; 61 page specification; 18 sheets of drawings.

Lecture Notes, CS276A, "Text Information Retrieval, Mining, and Exploitation," Nov. 19, 2002, http://www.stanford.edu/class/cs276a/handouts/lecture_13-gin1.pdf.

Andrei Z. Broder et al.: "Syntactic Clustering of the Web," *Proc. 6th International World Wide Web Conference*; Apr. 1997 and SRC Technical Note 1997-015; Jul. 25, 1997; pp. 1-14.

Andrei Z. Broder: "On the resemblance and containment of documents," *Proc. Of Compression and Complexity of Sequences 1997*; IEEE Computer Society; pp. 1-9.

Sergey Brin et al.; "Copy Detection Mechanisms for Digital Documents," *Proc. Of ACM SIGMOD Annual Conference*; San Jose, CA 1995; pp. 1-21.

Andrei Z. Broder: "Some applications of Rabin's fingerprinting method," *Sequences II: Methods in Communications, Security, and Computer Science*; (Springer-Verlag, 1993); pp. 1-10.

Min Fang et al.: "Computing Iceberg Queries Efficiently," *Proc. 24th International Conference on Very Large Databases*; (1998); pp. 1-25.

* cited by examiner

Document: "The quick brown fox jumped over the lazy dog."

| U | V |
|---|---|
| the | fox |
| quick | jumped |
| fox | lazy |
| over | dog |

Document: "When the defendant won the plaintiff hit the judge."

| U | V |
|---|---|
| when | defendant |
| won | plaintiff |
| the | hit |
| defendant | judge |

Fig. 6

| Pair | Cluster(s) |
|---|---|
| $(V_0, V_0)$ | $C_1, C_{50}, ...$ |
| $(V_1, V_0)$ | $C_6, C_{30}, ...$ |
| $(V_2, V_0)$ | $C_1, C_5, ...$ |
| ... | ... |
| $(V_x, V_y)$ | $C_{40}, C_{42}$ |

303

| Cluster | Number of Pairs |
|---|---|
| $C_0$ | 10 |
| $C_1$ | 5 |
| $C_2$ | 100 |
| ... | ... |
| $C_i$ | 5 |

Fig. 7

DOCUMENT SIMILARITY DETECTION

BACKGROUND OF THE INVENTION

A. Field of the Invention

The present invention relates generally to document processing and, more particularly, to comparing documents to find similar or near duplicate documents.

B. Description of Related Art

There are a number of applications in which it may be desirable to be able to determine whether documents are similar or near duplicates of one another. Detecting spam email is one such application. Spam is unsolicited commercial email that is transmitted to multiple email accounts. To the receiver, spam is generally considered to be "junk email."

In a typical spam episode, a single message is sent to thousands of email accounts. One known technique for removing spam from a network identifies spam based on its content. Thus, the network may be designed to recognize when many identical emails are being transmitted across the network. These identical emails can then be considered candidates for deletion before they arrive at the user email account.

In an effort to thwart automated spam detection and deletion, spam senders may slightly alter the text of each spam email by adding, removing, or replacing characters or superfluous sentences so as to defeat duplicate matching schemes. Thus, altered spam messages may be highly similar, but not identical, to one another.

Other applications for which similar document detection may be useful include detection of plagiarism and duplicate document detection in search engines.

Thus, there is a need in the art for techniques that can more accurately detect similar or near duplicate documents.

SUMMARY OF THE INVENTION

A document similarity detection technique consistent with the principles of the invention compares documents based on a set of relationships that define the relative order of terms within the documents.

One aspect of the invention is directed to a method for determining similarity of a document to a first set of documents. The method includes building a similarity model that defines a relative ordering of terms in the first set of documents, comparing an ordering of terms from the document to the similarity model, and generating similarity metrics that describe a degree of similarity between the document and the documents in the first set of documents based on the comparing of the ordering of terms.

Another aspect of the invention is directed to a similarity detection device. The device includes an inverted index that relates pairs of terms to clusters that contain the pairs of terms. The device further includes an enumeration component that generates pairs of terms for a received document and a pair lookup component that looks up the generated pairs in the inverted index to obtain clusters that contain the generated pairs. Further, the device includes a cluster selection component that selects those of the clusters obtained by the pair lookup component that are similar to the received document.

BRIEF DESCRIPTION OF THE DRAWINGS

The accompanying drawings, which are incorporated in and constitute a part of this specification, illustrate the invention and, together with the description, explain the invention. In the drawings.

FIG. 4 is a diagram illustrating a cluster for an exemplary document;

FIG. 5 is a diagram illustrating another exemplary cluster;

FIG. 6 is a diagram illustrating an inverted index formed consistent with an aspect of the invention;

FIG. 7 is a diagram illustrating an exemplary implementation of the table of pairs shown in FIG. 3;

DETAILED DESCRIPTION

Figure 1:
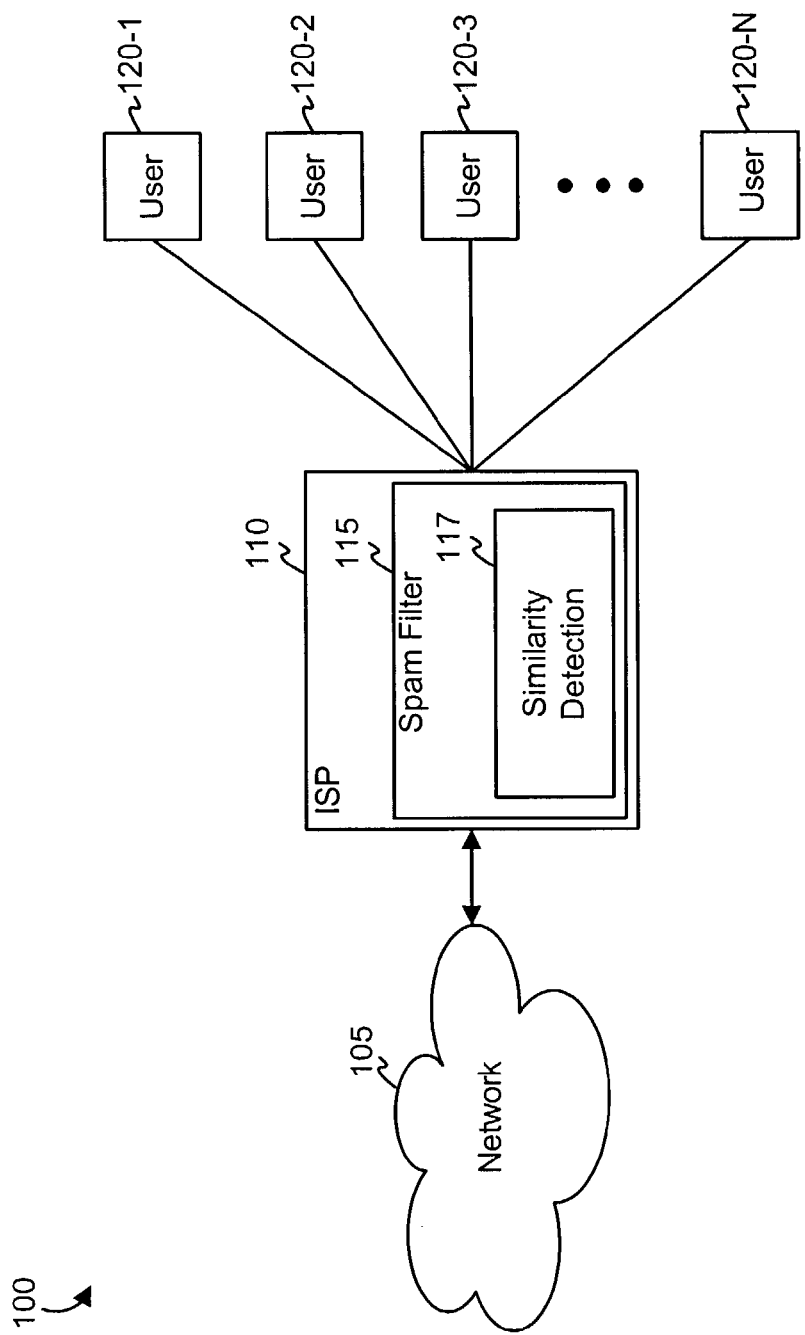
FIG. 1 is a diagram illustrating an exemplary spam detection/elimination system implemented using concepts consistent with the invention.

The following detailed description of the invention refers to the accompanying drawings. The detailed description does not limit the invention. Instead, the scope of the invention is defined by the appended claims and equivalents.

There are many ways in which documents may be determined to be similar, duplicates or near duplicates.

One document similarity detection technique is a "shingle" method. In the shingle method, a small consecutive sequence of words within a document is called a shingle. Two documents are said to be similar if they have several shingles in common. One problem with using the shingle method in adversarial situations, such as spam email, is that an adversary can defeat the matching algorithm by performing local swaps, replacements, or deletions of words within a sentence without changing the meaning of the sentence. As an example of this, consider the sentence: "The quick brown fox jumped over the lazy dog," which can be transformed to: "The brown quick fox jumped over a lazy dog." These two sentences do not share a single shingle of length four. Thus, the shingle method may classify these two sentences as not nearly identical when semantically the sentences are near duplicates of one another. Accordingly, automated programs that randomly alter words at the sentence level (such as substituting words with close synonyms, switching consecutive adjectives, and other local transformations) can defeat the shingle method.

Another document similarity detection technique is based on considering a document as a vector of terms. For example, the sentence: "The quick brown fox jumped over the lazy dog," could be considered as a vector having eight entries—one for each unique word in the sentence. Term vector approaches known in the art, however, throw out ordering information in the document. Throwing out the ordering information can make it easier to get false matches when trying to find near duplicate documents because documents with the same words but entirely different word orders will be considered identical even though the documents may not be similar.

As an example of the possible problems of a term vector approach to detecting similar documents, consider the following three sentences: (1) When the defendant won the plaintiff hit the judge, (2) The judge hit the defendant when the plaintiff won, and (3) When the plaintiff hit the judge the defendant won. In a simple implementation of term vector similarity, all three sentences would have the same weighted term vectors and would be considered exact duplicates. For spam email duplicate detection, false matches are highly undesirable because it is important to users that legitimate emails are not deleted.

The detection of near duplicate or highly similar documents is also useful in many other applications, such as detection of plagiarism, duplicate document detection in search engines, etc. For web search engines, in particular, duplicate documents can often be undesirable. Storing duplicate documents effects both the accuracy and efficiency of the search engine. Further, retrieving duplicate documents in response to a user's query may lower the number of valid responses provided to the user, thus lowering the quality of the response set.

In one aspect of the present invention, a similarity detection component detects similar or near-duplicate documents based on pairs of ordered terms defined for the documents. A document may be characterized as a cluster containing a number of pairs of words. Another document having a relatively high number of pairs in common with the cluster is potentially a similar or near-duplicate of the document characterized by the cluster. Of course, the choice of pairs of ordered terms merely illustrates one embodiment of the present invention, and the invention is equally applicable to other sets of information, e.g. triplets of terms, quadruples, etc. Similarly, terms may refer to words, phrases, sentences, or other units of information as applicable, and may also refer to punctuation, tags, such as HTML tags, or other information. As used herein, a document is to be broadly interpreted to include any machine-readable and machine-storable work product. A document may be an email, a file, a combination of files, one or more files with embedded links to other files, etc. The files may be of any type, such as text, audio, image, video, etc. In the context of the Internet, a common document is a Web page. Web pages often include content and may include embedded information (such as meta information, hyperlinks, etc.) and/or embedded instructions (such as Javascript, etc.).

System Overview

FIG. 1 is a diagram illustrating an exemplary spam detection/elimination system 100 implemented using concepts consistent with the invention. Spam detection/elimination may be performed by an internet service provider (ISP) 110 on behalf of its customers (users) 120-1 through 120-N (collectively referred to as users 120). ISP 110 may operate to connect users 120 to network 105. Network 105 may be, for example, a public network, such as the Internet. Email destined for one of users 120 is received by ISP 110 and forwarded to the appropriate user(s). Similarly, email transmitted from one of users 120 is received and forwarded by ISP 110 towards its final destination.

ISP 110 may include a spam filter 115, which may be implemented as a computer program stored on a computer-readable medium. Spam filter 115 may examine incoming email and delete messages that it determines to be spam. Spam filter 115 may make this determination based on results from a similarity detection component 117, which determines similarity between documents. If multiple emails transmitted through ISP 110 are determined by similarity detection component 117 to be highly similar or near duplicates of one another then spam filter 115 may consider these emails to be candidates for deletion. In some implementations, other features of the email messages, such as the transmitting domain name associated with the email messages, may be taken into account by spam filter 115 when determining whether to classify an email message as spam.

Figure 2:
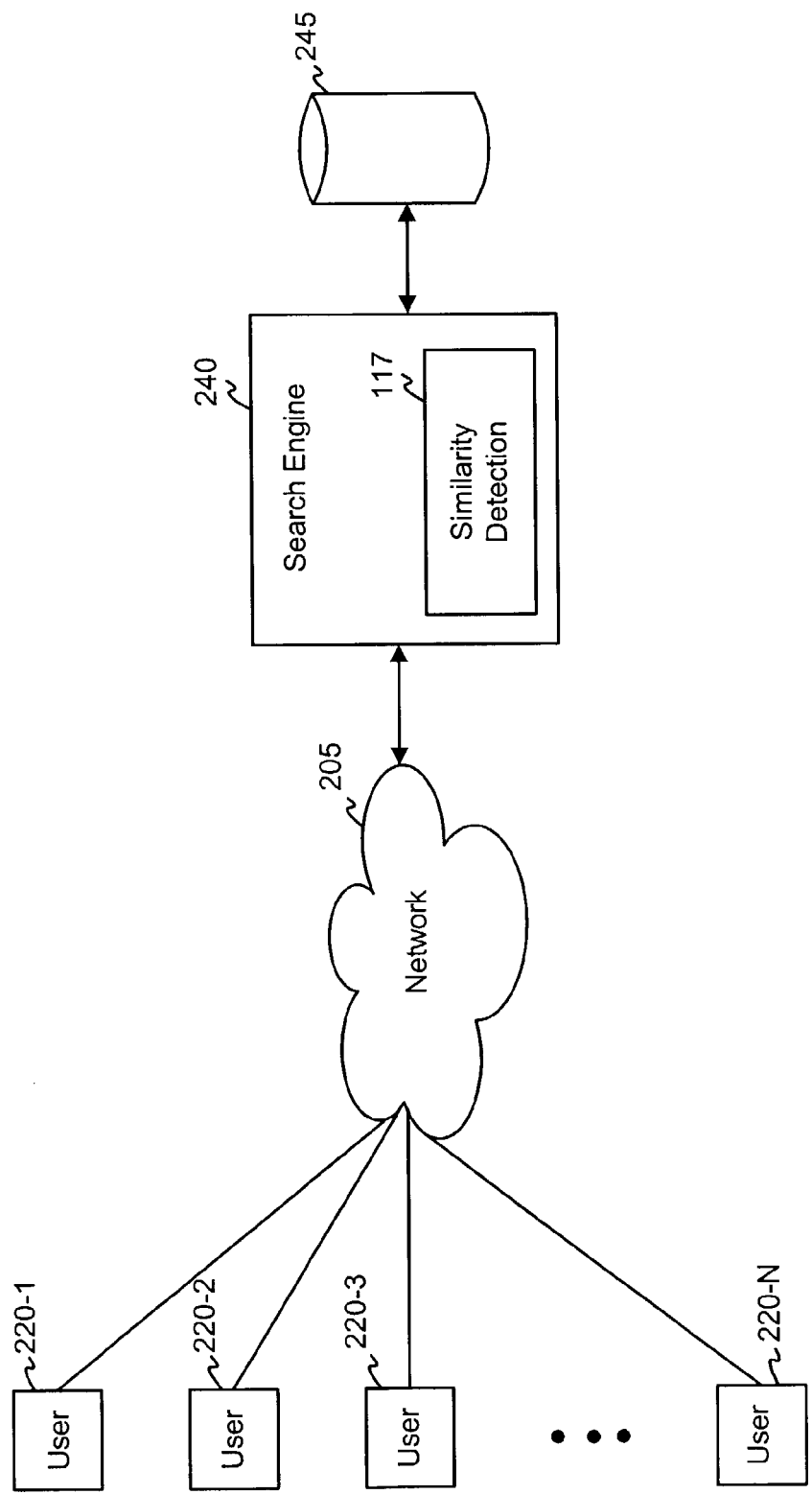
FIG. 2 is a diagram illustrating an exemplary implementation of a similarity detection component in the context of a web search engine.

Another possible application of similarity detection component 117 is in the area of search engines. FIG. 2 is a diagram illustrating an exemplary implementation of similarity detection component 117 in the context of a web search engine. As shown in FIG. 2, a number of users 220-1 through 220-N (collectively referred to as users 220) may query a search engine 240 through a network 205. Network 205 may be a public network, such as the Internet.

Search engine 240 may be a program stored in a computer-readable medium that locates relevant information in response to search queries from users 220. In particular, users 220 send search queries to search engine 240, which responds by returning a list of relevant information to users 220. Typically, users 220 ask search engine 240 to locate web pages (i.e., documents) relating to a particular topic and stored at other devices or systems connected to network 205 (or another network). Search engine 240 may contain, or be coupled to, a database 245 that includes an index to the set of searchable web pages available though search engine 240.

Search engine 240 may use similarity detection component 117 in performing searches and/or in indexing the set of searchable web pages. Similar web pages detected by similarity detection component 117 may be used by search engine 240 in a number of ways. For example, highly similar web pages may not be separately stored in database 245. Alternatively, when returning results of a search to one of users 220, search engine 240 may use similarity detection component 117 to remove multiple references to nearly duplicate documents in the set of returned documents.

Similarity Detection Component

The operation of similarity detection component 117 according to one embodiment of the invention will next be described in detail. In general, similarity detection component 117 may operate in one of two modes. In the first mode, similarity detection component 117 adds new documents to a similarity model. In a second mode, similarity detection component 117 receives a document and determines if the document is similar to any of the documents in the model.

Figure 3:
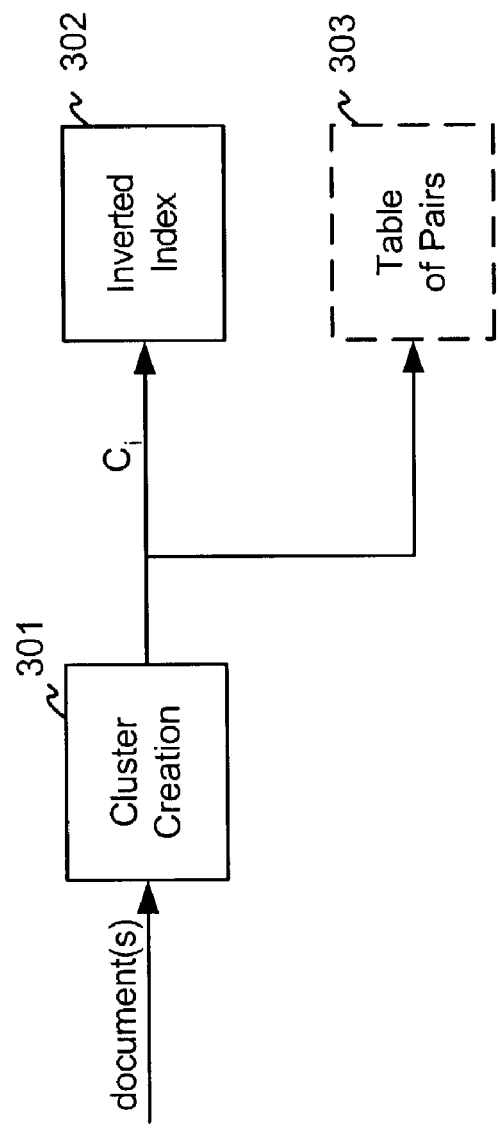
FIG. 3 is a block diagram conceptually illustrating operational components of the similarity detection component shown in FIGS. 1 and 2 when adding a new document to a similarity model.

FIG. 3 is a block diagram conceptually illustrating operational components of similarity detection component 117 when adding a new document to the similarity model (first mode). As shown, similarity detection component 117 includes a cluster creation component 301, an inverted index 302, and a table of pairs 303. The similarity model may be considered as including the inverted index 302 and the table of pairs 303. In some implementations, table of pairs 303 may be omitted.

Cluster creation component 301 creates clusters $C_i$ that describe documents. A cluster may be created for each of a number of documents i. Each cluster, $C_i$, may include one or more pairs of words from document i. Stated more formally $$C_i = (u_0, v_0), (u_1, v_1), \ldots, (u_n, v_n),$$

where u and v represent terms in document i in which u comes before v, but the terms do not have to be consecutive. Thus, the pair $(u_0, v_0)$ represents that document i contains the term $u_0$ and the term $v_0$ and that $u_0$ occurs before $v_0$. Generally, another document is said to be similar if it includes pairs that match the pairs in $C_i$. In other words, the other document is similar if it tends to contain words in the same order as those that appear in document i.

FIG. 4 is a diagram illustrating a cluster for an exemplary document: "The quick brown fox jumped over the lazy dog." As shown, the cluster created for this document includes four pairs 401-404. Pair 401 represents that the term "the" comes before the word "fox." Pair 402 represents that the term "quick" comes before the term "jumped." Pair 403 represents that the term "fox" comes before the term "lazy." Pair 404 represents that the term "over" comes before the word "dog." Another document is considered similar to this document if most of the constraints defined by pairs 401-404 are satisfied. Thus, the document "the brown quick fox jumped over a lazy dog" would be considered similar.

As another example of a cluster, consider the randomly sampled pairs shown in FIG. 5 for the document: "When the defendant won the plaintiff hit the judge." For these pairs, the document "The judge hit the defendant when the plaintiff won" only matches one of the four pairs. Also, the document "When the plaintiff hit the judge the defendant won" only matches two of the pairs. Thus, neither of these two documents would be considered similar to the original.

Cluster creation component 301 may store each created pair for a cluster in inverted index 302. Inverted index 302 lists, for each pair, the clusters for which that pair was created. FIG. 6 is a diagram illustrating an exemplary portion of inverted index 302. Pairs 601-1 through 601-M are listed in inverted index 302. For each of pairs 601, index 302 includes a corresponding list 610-1 through 610-M of the clusters for which the particular pair 601 was created. For example, as shown in FIG. 6, pair 601-1 belongs to a number of clusters, including the clusters labeled $C_1$ and $C_{50}$.

In addition to maintaining inverted index 302, cluster creation component 301 may update table 303 when adding a new document to the similarity model. FIG. 7 is a diagram illustrating an exemplary implementation of table 303. As shown, table 303 may store the number of pairs that each cluster contains. Cluster creation component 301 may update table 303 whenever it creates a cluster for a document.

Figure 8:
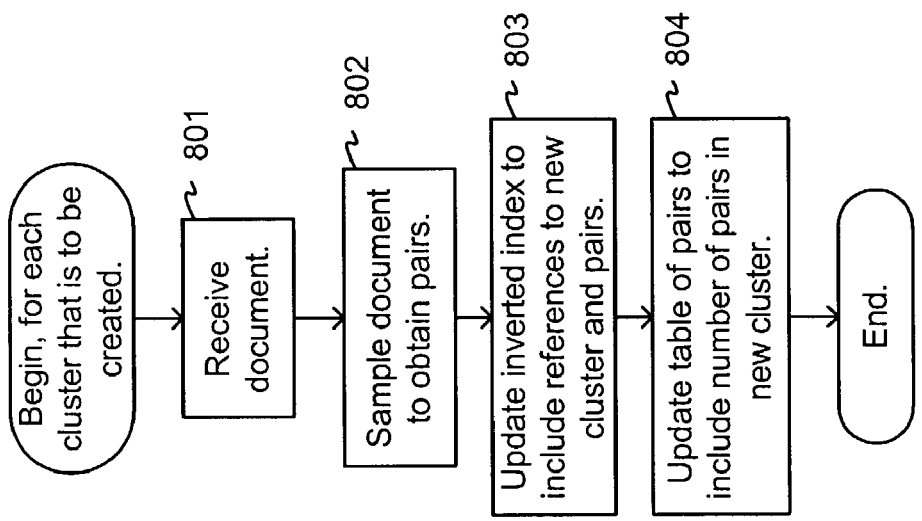
FIG. 8 is a flow chart illustrating the creation of a cluster by cluster creation component of FIG. 3 consistent with an aspect of the invention.

The creation of a cluster $C_i$ by cluster creation component 301 will now be described in more detail with reference to the flow chart of FIG. 8. Cluster creation component 301 may begin by receiving the document from which it will generate a cluster, (Act 801), and then sampling the document to obtain the pairs for the cluster (Act 802).

Sampling the document to obtain the pairs can be performed using a number of different sampling techniques. The general goal is to create a useful representation of the document for the purpose of later determining similarity of the document to other documents. In one implementation, cluster creation component 301 randomly samples pairs of words from the input document. In one variation to this random sampling approach, the "random" sampling may be biased so that terms closer to each other have a greater chance of being included in a pair.

The number of pairs to sample for each cluster may be based on the length of the documents. Thus, clusters for longer documents may include more pairs.

Terms that have a lower frequency of occurrence in a corpus are often more relevant to the meaning of a document than more common terms. Accordingly, in some implementations, cluster creation component 301 may include a bias that is more likely to sample less frequently occurring terms. On the other hand, terms that are very rare, such as random sequences of symbols used by spammers to thwart similarity detection schemes, may not be included in the pairs of a cluster. Thus, in one embodiment cluster creation component 301 may be biased to sample rare words but to avoid very rare words. One of ordinary skill in the art will recognize that a precise meaning of "rare" and "very rare" may be obtained for a particular application through experimentation and/or observation of the frequency of occurrence of various terms in the corpus.

In addition to avoiding very rare terms, other terms, such as terms within HTML tags, may be ignored when sampling a document.

As another possible variation on document sampling, cluster creation component 301, instead of creating clusters that include entries that are pairs, may create clusters from triple, quadruple, or n-ary cluster entries. Such n-ary cluster entries may be referred to as n-ary vectors. For a cluster made of three term sets, for example, each entry would represent that the first term occurs before the second term, which both occur before the third term.

In another variation on the document sampling, cluster creation component 301 may bias the sampling such that pairs that occur in a pre-selected section of the document such as the upper middle section of the document are preferred. Email spammers may place "junk" terms near the bottom or beginning of a document in an attempt to thwart similarity detection. However, too many "junk" terms placed near the upper middle section of an email, such as in the first few paragraphs of the email, can make the email difficult to read and the reader may lose interest in the email if he/she has to scan past multiple lines of random text before seeing the true message. Accordingly, by sampling pairs from the upper middle section of a document, the clusters generated by cluster creation component 301 may be more resistant to spammer counter-measures. Cluster creation component 301, after sampling the pairs for a cluster, may update inverted index 302 to reflect the new cluster (Act 803). Cluster creation component 301 may also update table 303 by adding an entry in table 303 for the new cluster (Act 804). The entry may indicate the number of pairs that were sampled for the cluster.

The above discussion of similarity detection component 117 described the operation of similarity detection component 117 when adding a new document to the similarity model. In the second mode of operation, similarity detection component 117 determines similarity of an input document based on the similarity model defined by inverted index 302.

Figure 9:
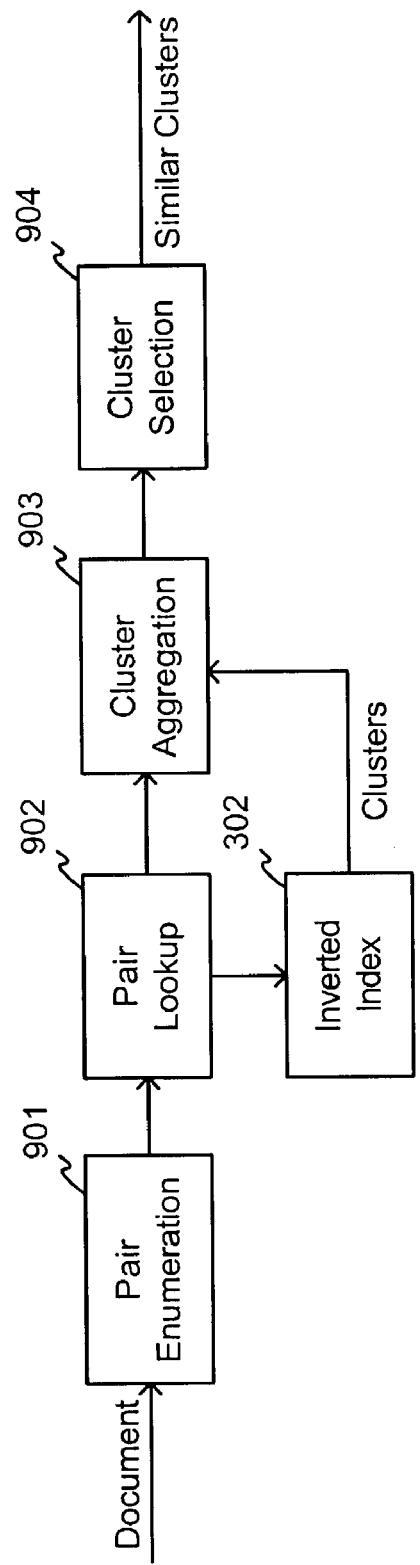
FIG. 9 is a block diagram conceptually illustrating operational components of the similarity detection component when determining similarity of an input document consistent with an aspect of the invention.

FIG. 9 is a block diagram conceptually illustrating operational components of similarity detection component 117 when determining similarity of an input document. As shown, in this mode of operation, similarity detection component 117 may include pair enumeration component 901, pair lookup component 902, cluster aggregation component 903, and cluster selection component 904.

Pair enumeration component 901 enumerates the pairs within the input document. In one implementation, pair enumeration component 901 may enumerate all possible pairs for the input document. In other implementations, the pairs may be enumerated within a fixed window size within the input document. In this implementation, for each word u within the input document, pair enumeration component 901 may enumerate all pairs of words that include u and that are within a fixed number of words (the window size) after u. The window may then be moved to the next word after u and the process repeated. For example, if a document includes the five consecutive words a, b, c, d, and e, and the window size is set to three, pair enumeration component 901 may begin by forming the pairs ab, ac, and ad. Pair enumeration component 901 may then move the sliding window to word b and enumerate the pairs bc, bd, and be. The window may then be moved again and this process repeated for each word in the document. Using a fixed window size can be beneficial for both accuracy and efficiency.

For each enumerated pair, pair lookup component 902 may look up the pair in inverted index 302 to determine the previously stored clusters that correspond to the pair. Cluster aggregation component 904 may keep track of each cluster that was looked-up for the input document, as well as the number of occurrences of that cluster. For example, a short input document, after enumeration by pair enumeration component 901, may be determined to contain 10 pairs. The 10 pairs may correspond to 30 different clusters in the similarity model. Some of the 30 different clusters may have been output multiple times from inverted index 302, which indicates that the input document has multiple pairs in common with the document corresponding to the cluster.

Cluster selection component 904 may select the most frequently occurring clusters stored by cluster aggregation component 903. These are the clusters that have the most pairs in common with the input document. The most frequently occurring clusters can be defined as an absolute number (e.g., the input document may contain 15 of the pairs in $C_{10}$) or on a percentage basis (e.g., the input document may contain 90% of the pairs included in cluster $C_{10}$) or by using any other measure.

Figure 10:
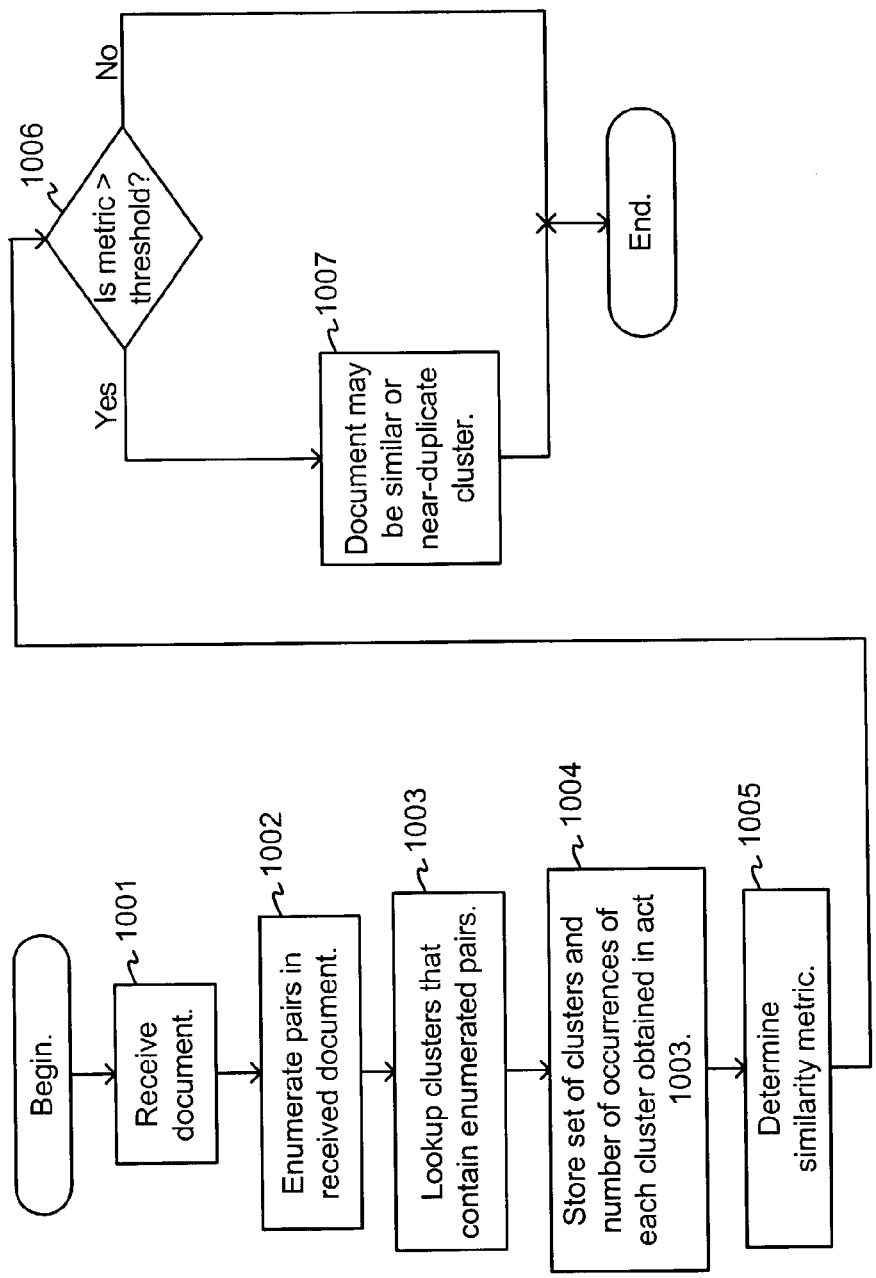
FIG. 10 is a flow chart illustrating the operation of the similarity detection component when determining similarity of an input document.

The operation of similarity detection component 117 when determining similarity of an input document will now be described in more detail with reference to the flow chart shown in FIG. 10.

Similarity detection component 117 may begin by receiving a document for which a similarity determination is to be made (Act 1001). The received document will be called document B for purposes of this explanation. Pair enumeration component 901 may then enumerate pairs in document B (Act 1002). As previously mentioned, pair enumeration component may enumerate all possible pairs within document B or a subset of the possible pairs within document B. For example, all possible pairs of words (u,v) where u and v are within a fixed distance from each other in document B may be enumerated.

For each pair enumerated in Act 1002, pair lookup component 902 may use inverted index 302 to obtain the clusters that contain the pair (Act 1003). The total set of clusters, C(B), obtained by pair lookup component 902 may be maintained by cluster aggregation component 903 (Act 1004). Pair lookup component 902 may additionally tabulate the number of pairs that document B has in common with each cluster in C(B) (Act 1004).

Cluster selection component 904 may then use the information obtained in Act 1004 to determine a similarity metric that describes the similarity of document B to the documents that correspond to the clusters in C(B) (Act 1005). As mentioned, in one implementation, cluster selection component 904 may divide the number of pairs that document B has in common with a cluster to the number of pairs in that cluster to obtain the percentage of pairs that document B shares with the cluster. In another implementation, cluster selection component 904 may use the absolute number of pairs that document B has in common with the cluster as the similarity metric (e.g., B contains 15 of the pairs in cluster $C_{10}$). Cluster selection component 904 may then compare the calculated similarity metrics for the clusters to a predetermined threshold value (Act 1006). Values above the threshold may indicate that the document B is a similar or near-duplicate document to the document corresponding to the cluster (Act 1007).

Longer documents are more likely to contain word pairs in the correct ordering. In some implementations, in order to further determine whether a document is to be considered a similar or near-duplicate document, additional factors, such as document length or a comparison of term vectors for the input document and the documents in the similarity model may also be performed.

Although the above discussion of duplicate or near duplicate document detection was primarily concerned with applications in spam email detection, other applications, such as plagiarism detection, are possible. In one plagiarism detection scheme, for example, a document A may be added to the similarity model by sampling pairs (or n-ary cluster entries), as previously described. Additionally, each paragraph or few paragraphs of document A (or other segments of document A) may be independently added to the similarity model as if it was an independent document. When adding paragraphs, the document from which the paragraph was excerpted from is also stored by the similarity model.

When a new document B is to be checked for plagiarism, the new document may be compared as a whole to determine if it is similar, and also compared as segments, such as paragraphs, to determine if any of the segments are similar. A final plagiarism judgment on document B can then be made based on one or more of a number of factors, including: (1) how many matching clusters document B has with other documents in the similarity model, (2) how many paragraphs (or other segments) in document B are similar to other paragraphs inserted in the similarity model, and (3) how many similar paragraphs document B has to each document A in the model. Thus, item (1) can be used to determine whether document B is a near copy of another document. Item (2) can be used to determine whether document B includes paragraphs from several other different documents. Item (3) can be used to determine whether document B includes multiple paragraphs from the same document.

CONCLUSION

The similarity detection described above can detect similar or near duplicate occurrences of a document and is relatively robust in the face of deliberate attempts to thwart its operation. The similarity detection component determines similarity of documents by characterizing the documents as clusters each made up of a set of term pairs. Another document that has a threshold level of term pairs in common with a cluster may be considered similar to the document characterized by the cluster.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method performed by a computer system, the method comprising:
    randomly sampling pairs of ordered terms from a particular document of a set of documents, to generate a cluster of pairs of ordered terms for the particular document,
    where the pairs of ordered terms include a first term and a second term and where, in at least some of the pairs of ordered terms, the second term occurs after one or more intervening terms occurring after the first term in the particular document, and
    where the random sampling is biased to have a higher chance of including a first ordered pair in the cluster than a second ordered pair, if the first ordered pair has fewer intervening terms that the second ordered pair, the randomly sampling being performed using one or more processors associated with the computer system;
    building, using one or more processors associated with the computer system, a similarity model that includes the cluster of pairs;
    comparing, using one or more processors associated with the computer system, a cluster of pairs from a target document to clusters of pairs from the similarity model;
    generating, using one or more processors associated with the computer system, similarity metrics that measure similarity between the target document and particular documents in the set of documents, the generating being based on the comparing; and
    outputting the generated similarity metrics.

2. The method of claim 1, where the clusters and the pairs of ordered terms included in the clusters are stored in an inverted index that lists, for each of the pairs of ordered terms, the clusters in which the pair is found.

3. The method of claim 1, where building the similarity model further includes:
    updating a table that defines a number of pairs of ordered terms associated with each of the clusters.

4. The method of claim 1, where a number of pairs of ordered terms sampled for the particular document is based on a length of the particular document.

5. The method of claim 1, where the sampling includes biasing the sampling to give preference to rare terms.

6. The method of claim 5, where the sampling includes excluding very rare terms from the sampling.

7. The method of claim 1, where the sampling includes biasing the sampling to give preference to terms that occur in pre-selected sections of the documents.

8. The method of claim 1, where the comparing includes:
    comparing pairs of ordered terms from the target document to the similarity model by enumerating all possible pairs of ordered terms from the target document.

9. The method of claim 1, where the comparing includes:
    comparing pairs of ordered terms from the target document to the similarity model by enumerating pairs from the target document such that a first term and a second term in one of the enumerated pairs appears within a fixed distance of each other in the target document.

10. A similarity detection device comprising:
    a cluster creation hardware-implemented component that generates clusters of pairs of ordered terms by randomly sampling documents,
        where a particular pair of ordered terms includes a first term that occurs before a second term in a particular document, and where at least some of the pairs of ordered terms include terms that occur non-consecutively in the particular document, and
        where the random sampling is biased such that terms closer to one another, as measured based on a number of terms separating two terms, have a greater chance of being included, in a particular cluster, as one of the pairs of ordered terms;
    an inverted index hardware-implemented component that relates an order of occurrence of pairs of ordered terms to clusters that contain the pairs of ordered terms;
    an enumeration hardware-implemented component that generates pairs of ordered terms for a first document that is to be compared to the inverted index;
    a pair lookup hardware-implemented component that looks up the generated pairs of ordered terms in the inverted index to obtain clusters that contain the generated pairs of ordered terms; and
    a cluster selection hardware-implemented component that selects clusters obtained by the pair lookup component that are similar to the first document.

11. The similarity detection device of claim 10, where the cluster selection component selects the clusters that are similar to the first document based on a similarity metric that quantifies a presence of the generated pairs in the clusters.

12. The similarity detection device of claim 10, where a number of pairs of terms sampled from each document is based on a length of the document.

13. The similarity detection device of claim 10, where the sampling pairs of terms includes biasing the sampling to give preference to rare terms.

14. The similarity detection device of claim 13, where the sampling pairs of terms excludes very rare terms from the sampling.

15. The similarity detection device of claim 10, where the sampling pairs of terms includes biasing the sampling to give preference to terms that occur in a pre-determined section of the documents.

16. A device for determining similarity of a target document to a first set of documents, the device comprising:
    a memory to store instructions; and
    a processor to execute the instructions to implement:
        means for randomly sampling pairs of ordered terms from a particular document of a set of documents, to generate a cluster of pairs of ordered terms for the particular document,
            where the pairs of ordered terms include a first term and a second term and where, in at least some of the pairs of ordered terms, the second term occurs after one or more intervening terms occurring after the first term in the particular document, and
            where the random sampling is biased to have a higher chance of including a first ordered pair in the cluster than a second ordered pair, if the first ordered pair has fewer intervening terms that the second ordered pair;
        means for building a similarity model that includes the cluster of pairs;
        means for comparing cluster of pairs from a target document to clusters of pairs from the similarity model;

means for generating similarity metrics that measure similarity between the target document and particular documents in the set of documents based on the comparing; and means for outputting the generated similarity metrics.

17. One or more memory devices comprising program instructions executable by least one processor, the one or more memory devices comprising:

one or more instructions to randomly sample pairs of ordered terms from a particular document of a set of documents, to generate a cluster of pairs of ordered terms for the particular document, where the pairs of ordered terms include a first term and a second term and where, in at least some of the pairs of ordered terms, the second term occurs after one or more intervening terms occurring after the first term in the particular document, and where the random sampling is biased to have a higher chance of including a first ordered pair in the cluster than a second ordered pair, if the first ordered pair has fewer intervening terms that the second ordered pair;

one or more instructions to build a similarity model that includes the cluster of pairs;

one or more instructions to compare pairs of ordered terms from a target document to clusters of pairs of ordered terms from the similarity model;

one or more instructions to generate similarity metrics that measure similarity between the target document and particular documents in the set of documents based on the comparing; and one or more instructions to output the generated similarity metrics.

18. The device of claim 16, where the processor further executes the instructions to implement:

means for storing clusters of pairs of ordered terms in an inverted index that associates a particular pair of ordered terms with clusters in which the particular pair is found.

19. The one or more memory devices of claim 17, further comprising:

one or more instructions to determine whether to add the target document to the set of documents, based on the generated similarity metrics.

20. The one or more memory devices of claim 17, further comprising:

one or more instructions to determine whether to categorize the target document as spam, based on the generated similarity metrics.

* * * * *